(No Model.)
2 Sheets—Sheet 1.
H. C. CROWELL.
FRICTION CLUTCH.
No. 461,929.
Patented Oct. 27, 1891.
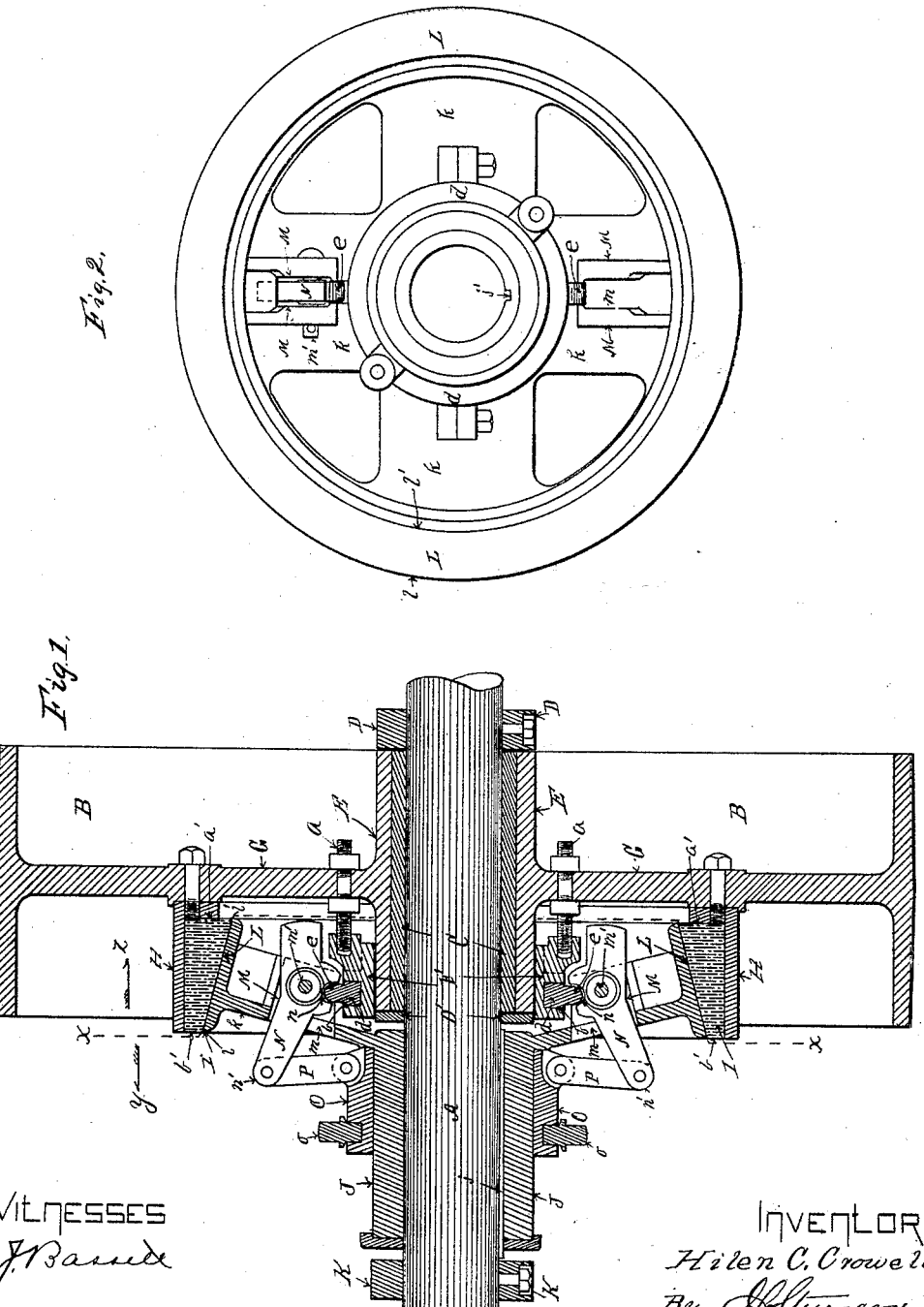
Witnesses
F. J. Barrett
S. D. Dobbins
Inventor
Hiren C. Crowell
By H. Sturgeon
Attorney (No Model.) 2 Sheets—Sheet 2.

H. C. CROWELL.
FRICTION CLUTCH.

No. 461,929. Patented Oct. 27, 1891.

Witnesses
F. J. Bassett
S. D. Dobbins

Inventor
Hilen C. Crowell
By A. Sturgeon
Att'y.

UNITED STATES PATENT OFFICE.

HILEN C. CROWELL, OF WESTFIELD, NEW YORK.

FRICTION-CLUTCH.

SPECIFICATION forming part of Letters Patent No. 461,929, dated October 27, 1891.

Application filed March 2, 1891. Serial No. 383,503. (No model.)

*To all whom it may concern:*

Be it known that I, HILEN C. CROWELL, a citizen of the United States, residing at Westfield, in the county of Chautauqua and State of New York, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in friction-clutches hereinafter set forth and explained, and illustrated in the accompanying drawings, in which—

Figure 3:
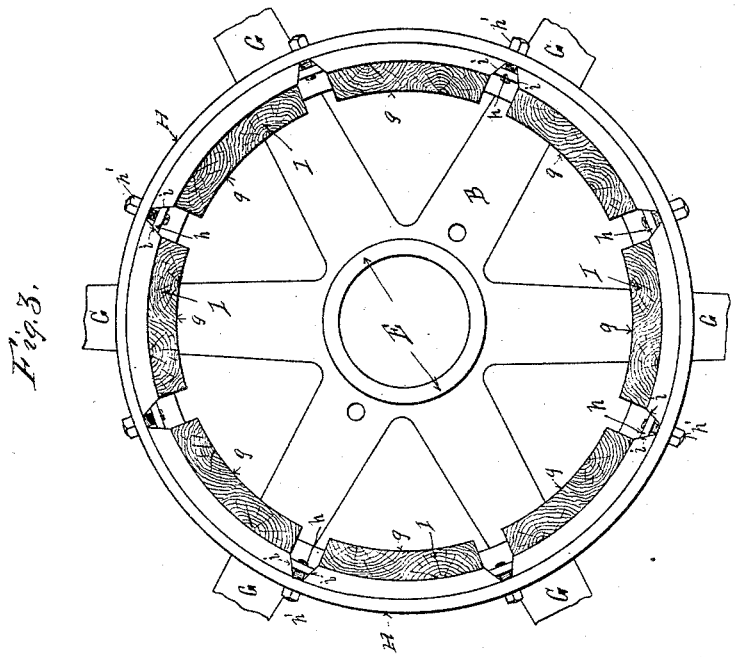
Figure 4:
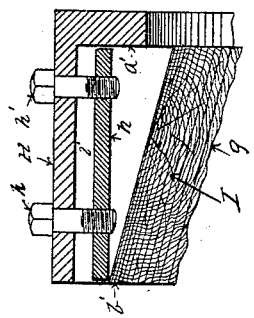

Figure 1 is a central longitudinal section of my improved friction-clutch. Fig. 2 is an end view of the clutch-disk thereof removed from the clutch on the line $x\ x$ in Fig. 1, looking in the direction of the arrow $y$. Fig. 3 is an end view of the clutch-ring thereof (parts of the pulley to which it is secured being broken away) removed from the clutch. Fig. 4 is an enlarged section of the clutch-ring, showing its construction.

Like letters refer to like parts in all the figures.

In the construction of my improved friction-clutch shown in the drawings, A is a shaft, and B a loose pulley mounted on a friction-bushing C on the shaft A between fixed collars D and D', secured upon said shaft at the ends of the sleeve C. On the inner end of the hub E of the pulley I place a sleeve F, secured to the arms G of the pulley B by means of adjustable bolts $a\ a$, passing through the arms G or fixed lugs on the pulley-hub, so that the sleeve F can be moved toward or from arms G of the pulley, as and for the purpose hereinafter set forth. In a groove $b$ in the sleeve F, I clamp a ring $d$, adapted to turn loosely upon the sleeve F, on which ring $d$ are lugs $e\ e$, as and for the purpose hereinafter set forth. To the inside faces of the arms G of the pulley B, I secure an annular ring or shell H. In this ring or shell H, I secure a friction-surface I, made of friction-blocks $g$, preferably of wood, secured in said ring or shell H by means of clips of metal $h$, engaging with the beveled ends $i$ of said friction-blocks $g$, said metal clips being secured by bolts $h'$, passing through the ring or shell H. The inner ends $a'$ of the blocks $g$, forming the friction-surface I, are made of about double the thickness of the outer ends $b'$ thereof, so as to form a friction-surface tapering from its outer to its inner end.

On the shaft A, next to the collar D thereon, I place a clutch-disk L, Fig. 2. The hub J of this clutch-disk I make of a considerable length, and secure it from rotary motion on the shaft A by means of a spline $j$ in the shaft A, fitting into a groove $j'$ in the hub J, the hub J so secured upon the shaft A being adapted to move endwise between the fixed collars D' and K on the shaft A. On the inner end of the hub J are arms $k$, supporting the clutch-disk L, the periphery of which is beveled from its outer edge $l$ to its inner edge $l'$, so as to fit into the beveled friction-surface I in the clutch-ring H. In the arms $k$, on the opposite sides of the clutch-disk L, I make openings $m$, and on the insides of the arms $k$, at each side of the openings $m$, I make ears M, between which ears are pivoted levers N on pins $m'$, and having notches $n$ therein adapted to engage with the lugs $e$ on the ring $d$, these lugs $e$ extending outward between the ears M, so that the ring $d$ rotates on the sleeve F in unison with the clutch-disk L when the pulley B is not moving. The notches $n$, it will be observed, are nearly at right angles with the operating-arm $n'$ of the levers N and engage continuously with the lugs $e$ on the ring $d$.

On the outside of the hub J of the clutch-disk L, I place an ordinary longitudinally-moving sleeve O, to the inner end of which I pivot links P, extending therefrom to the ends $n'$ of the levers N and pivoted thereto, so that the movement of the sleeve O longitudinally on the hub J toward the arms $k$ of the clutch-disk L raises the outer ends $n'$ on the levers N, which are engaged with the lugs $e$ on the ring $d$ by means of the notches $n$ therein, and thereby draws the clutch-disk L firmly into the friction-ring H and against the friction-surface I in the ring H on the pulley B, and when the sleeve O is moved in the opposite direction the outer ends $n'$ of the levers L are depressed and operate through the lugs $e$, engaged therewith, to withdraw the clutch-disk L away from the friction-surface I of the ring H on the pulley B, the sleeve O being operated by an ordinary shifter (not shown) coupled to the ring o thereon.

For the purpose of taking up wear and adjusting the clutch-disk L and the friction-surface I in proper relation to each other I move the sleeve F, upon which the ring d is mounted, toward or from the arms G of the pulley by means of the adjusting-bolts a a, as desired, so that I can at all times maintain a proper adjustment of the parts by taking up the wear when necessary.

In the construction of my invention shown and hereinbefore described I have shown and described but one of several convenient and available forms of construction which may be readily utilized in constructing my improved friction-clutch. Therefore I do not confine myself to the single construction of my invention hereinbefore shown and described; but

What I claim as new, and desire to secure by Letters Patent of the United States, is—

1. The combination, in a friction-clutch, of a friction-ring having its friction-surface beveled from its inner edge to its outer edge and secured to a pulley mounted on a shaft, so as to rotate but not to move longitudinally thereon, a longitudinally-adjustable sleeve on the inner end of the pulley-hub, and a ring adapted to rotate in a groove in said adjustable sleeve, with a clutch-disk beveled from its outer edge to its inner edge so as to fit the bevel in the said friction-ring and mounted on said shaft, so as to move longitudinally but not rotate thereon, levers mounted in the arms of said clutch-disk and engaging with the ring on the sleeve on the pulley-hub, a sleeve moving longitudinally on the hub of the clutch-disk, and links connecting said sleeve to said levers, substantially as and for the purpose set forth.

2. The combination, in a friction-clutch, of a sleeve F, adapted to be adjusted longitudinally on the hub of the pulley, a loose ring d, having lugs e thereon, mounted on said sleeve F, with adjustable bolts a passing through the arms of the pulley or through fixed lugs on the pulley-hub, substantially as and for the purpose set forth.

3. The combination, in a friction-clutch, of an annular ring H, having a smooth inner surface, with segmental sections g, having beveled ends i and adapted to fit against the inner surface of said annular ring H and forming a friction-surface I, and beveled clips h, adapted to fit between the ends of the segmental sections g, and bolts h', passing through said clips h and the friction-ring H, substantially as and for the purpose set forth.

In testimony whereof I affix my signature in presence of two witnesses.

HILEN C. CROWELL.

Witnesses:
 CHAS. JARECKI,
 JOHN S. RILLING.